United States Patent
Guerrera et al.

(10) Patent No.: US 9,530,451 B2
(45) Date of Patent: Dec. 27, 2016

(54) REDUCING NETWORK BANDWIDTH USAGE IN A DISTRIBUTED VIDEO EDITING SYSTEM

(71) Applicant: Adobe Systems Incorporated, San Jose, CA (US)

(72) Inventors: Enzo Guerrera, Monte Sereno, CA (US); Daniel McCormick, Kitchener (CA); Soenke Schnepel, Luetjensee (DE); Christian Erickson, Medford, MA (US)

(73) Assignee: Adobe Systems Incorporated, San Jose, CA (US)

( * ) Notice: Subject to any disclaimer, the term of this patent is extended or adjusted under 35 U.S.C. 154(b) by 51 days.

(21) Appl. No.: 14/092,008

(22) Filed: Nov. 27, 2013

(65) Prior Publication Data
US 2015/0150062 A1   May 28, 2015

(51) Int. Cl.
*H04N 7/173* (2011.01)
*G11B 27/031* (2006.01)
*H04N 21/231* (2011.01)
*H04N 21/2343* (2011.01)
*H04N 21/24* (2011.01)
*H04N 21/433* (2011.01)
*H04N 21/442* (2011.01)
*H04N 21/854* (2011.01)

(52) U.S. Cl.
CPC ....... *G11B 27/031* (2013.01); *H04N 21/23106* (2013.01); *H04N 21/23439* (2013.01); *H04N 21/2402* (2013.01); *H04N 21/4331* (2013.01); *H04N 21/44209* (2013.01); *H04N 21/854* (2013.01)

(58) Field of Classification Search
CPC .................................................. H04N 21/433
See application file for complete search history.

(56) References Cited

U.S. PATENT DOCUMENTS

2008/0056383 A1* 3/2008 Ueki et al. .............. 375/240.26
2008/0301749 A1* 12/2008 Harrar et al. ................. 725/131
2009/0141792 A1* 6/2009 Mori ............. H04N 21/234381
                                                                                   375/240.01

(Continued)

FOREIGN PATENT DOCUMENTS

JP    WO 2013145419 A1 *  10/2013 ............. H04N 5/765

*Primary Examiner* — Joshua Taylor
(74) *Attorney, Agent, or Firm* — Finch & Maloney PLLC

(57) ABSTRACT

Techniques are disclosed for reducing the amount of network bandwidth used by a distributed video editing system. A server dynamically chooses from among several encoding options, depending on the context and network conditions. The server makes every attempt to transmit a given video frame only once over the network. Depending on network performance, the quality of the transmitted video may vary. A frame identification technique is used to improve efficiency to avoid duplication of rendering work. On the client, the frame identity is used by the client to cache the frames individually, at varying qualities. These frames are cached on the client indefinitely. When the client prepares to play a frame, it examines its local cache of frames and chooses either a local cached frame or requests a remote frame at a different quality, based on the context.

18 Claims, 5 Drawing Sheets

(56) References Cited

U.S. PATENT DOCUMENTS

| | | | |
|---|---|---|---|
| 2010/0208064 A1* | 8/2010 | Liu | G08B 13/19667 348/143 |
| 2011/0106969 A1* | 5/2011 | Choudhury et al. | 709/236 |
| 2013/0321562 A1* | 12/2013 | Takahashi | 348/14.06 |
| 2015/0089558 A1* | 3/2015 | Shimizu | H04N 5/765 725/96 |

\* cited by examiner

REDUCING NETWORK BANDWIDTH USAGE IN A DISTRIBUTED VIDEO EDITING SYSTEM

FIELD OF THE DISCLOSURE

This disclosure relates generally to the field of data processing, and more particularly, to techniques for reducing the amount of network bandwidth used by a distributed video editing system.

BACKGROUND

Streaming video is a form of multimedia that is presented to a user while being delivered over a network by a provider, as distinguished from simple file transfer, which involves receiving the entire video content before playing it back. Streamed video content is broken into a series of file segments that are delivered to the user using a network protocol at a rate and quality that can be limited by the available bandwidth of the network. Using a suitable application, the user can view each segment after it has been delivered and while other segments are being delivered. In this manner the user can begin viewing the content without waiting for all of the segments to arrive.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
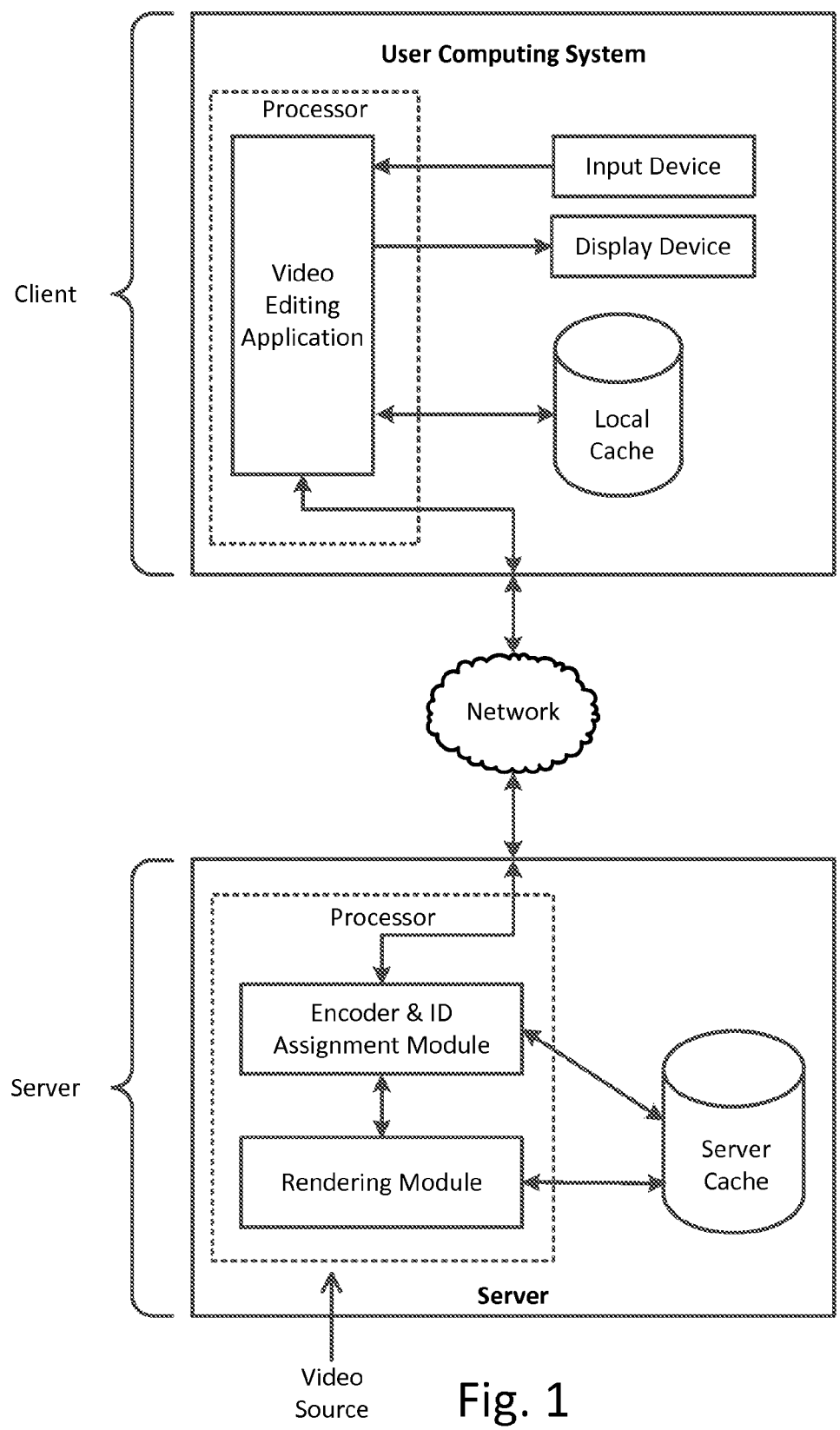
FIG. 1 illustrates an example client-server system configured in accordance with an embodiment of the present invention.

Maintaining high visual quality of a video in a networked video system is generally a difficult problem, primarily due to bandwidth limitations between the source of the video and the destination. As will be appreciated in light of this disclosure, it is recognized that while editing video, individual video frames may be displayed in an unpredictable sequence, which is determined by the user. Therefore, during editing it is desirable to have fast response times as well as high visual quality, since delays in acquiring and displaying individual frames can impede the editing process. These characteristics can be at odds with each other, particularly in a networked video editing system, because bandwidth limitations can force trade-offs between the speed of delivery and the quality of the video. While such trade-offs can be mitigated by increasing the network bandwidth, this is not always practical due to factors such as cost and infrastructure limitations. Instead of, or in addition to, increasing bandwidth, the desired results may be achieved by reducing the amount of data that is transmitted over the network. For streaming playback, network video systems may use a flexible bitrate codec (data encoding and compression algorithm), where the bitrate of the codec can change based on network performance. While such solutions for streaming video may be adequate for viewing video content in normal sequences, these solutions are inadequate for video editing, where segments of video can be played repeatedly in different directions, moved around in a video timeline, and often placed into entirely different sequence timelines. Moreover, simply reducing or improving the quality of streaming video in response to network performance can result in undesirable "pumping" video quality shifts (e.g., where the video quality varies over time).

Thus, and in accordance with an embodiment of the present invention, techniques are disclosed for reducing the amount of network bandwidth used by a distributed video editing system. In a specific embodiment, a server dynamically chooses from among several encoding options, depending on the given context (e.g., normal playback, editing process and/or a network performance characteristic). The server makes every attempt to transmit a given video frame only once over the network to the client so that the frame never needs to be re-transmitted, even though the same frame may be displayed in different contexts. Furthermore, caching can be employed on the client system to avoid delays caused by re-transmitting video from the server. Depending on network performance, the quality of the transmitted video may vary, which may cause the client to request re-transmission of the video at a better or worse compression quality. A frame identification technique is used to improve efficiency on both the client and the server to avoid duplication of rendering work. On the client, this frame identity, together with compression quality, is used by the client to cache the frames individually, at varying qualities. These frames can be cached on the client indefinitely. When the client prepares to play a frame, it examines a local cache of frames. Using the current playback or editing context, the client either uses a local cached frame or requests a remote frame at a different quality from a server to maintain consistent visual quality. In another embodiment, the video can be re-compressed to a lower quality on the client to maintain consistent visual quality. Numerous configurations and variations will be apparent in light of this disclosure.

As used herein, the term "distributed video editing system," in addition to its plain and ordinary meaning, includes a system where video content is communicated from one location (e.g., a server) to another (e.g., a client) via a wired or wireless network.

As used herein, the terms "visual quality" and "video quality," in addition to their plain and ordinary meanings, are used interchangeably and include any quantifiable attribute associated with a video frame or stream (e.g., a sequence of frames), such as resolution, contrast, noise, frame compression ratio, and frame update rate. Visual quality can, in some cases, be quantified subjectively and/or objectively against a metric, such as the signal-to-noise ratio or other benchmark-based metric. Visual quality is a general measure of the similarity of the compressed image to the original image, as perceived by the user of the system. Poor visual quality may be introduced by various means, including reduction in the size of the image, resulting in loss of image detail; color subsampling, resulting in loss or distortion of the color of the image; or image compression, resulting in distortion of detail or visual artifacts. Visual quality can be measured by an objective technique, such as pixel-by-pixel comparison of the compressed image to the original image. However, instead of using this computationally expensive technique, visual quality can be inferred by measuring the compression ratio or compression bit rate, based on subjective observation of the compression results at various ratios and bit rates, during development of the system.

As used herein, the term "codec," in addition to its plain and ordinary meaning, includes an application that is configured to encode, decode, compress and/or decompress a digital video signal.

In one specific embodiment of the present invention, several video codecs are used to provide the best possible video editing environment. A video editing server dynamically selects from among several encoding options, depending on the given context with respect to playback, editing and/or a network performance characteristic, such as available bandwidth and/or data transfer rate. The server makes every attempt to transmit a given video frame only once so that the same frame does not need to be re-transmitted each time it is displayed by the client. However, depending on network performance, the quality of the transmitted video may vary from frame to frame, which may require the client to request retransmission of at least one frame at a different compression level to maintain a consistent level of visual quality across multiple frames. A frame identification technique can be used to improve efficiency on both the client and the server to avoid duplication of rendering work. On the client, this frame identity, together with compression quality, can be used by the client to cache the frames individually, at varying qualities. These frames can be cached on the client indefinitely. When the client prepares to play a frame, it examines the local cache of frames. Using the current context (e.g., normal playback or editing process), the client can either choose a local cached frame or request the server to transmit the frame at a different quality to maintain the video quality at a relatively constant level. Additionally, uniquely identifying frames cached on the server reduces the overall cost (e.g., time) to provide the frame by reducing repetitive rendering of the same frame. Once a frame is rendered and given a unique identity, for example, fewer CPU resources (and possibly I/O resources) may be needed to transmit the same frame to another client or the same client more than once. In this manner, less network bandwidth is used than conventional solutions while maintaining good visual quality. In another specific embodiment, some video frames received from the server can be compressed by the client to a different (e.g., lower) quality that is consistent with one or more other frames already cached by the client.

By way of example, in an embodiment, the frame encoding (codec) can be varied by the server depending on network and playback conditions. For editing operations that can tolerate latency but require high visual quality (e.g., for a stopped or paused frame), the server employs a visually lossless codec to deliver the highest quality image to the client. For instance, during normal forward playback, the server encodes frames using a GOP (Group of Pictures) codec, which is an interframe encoding technique that enables delivery of good visual quality at a very low bandwidth. However, when performing other operations that involve loading multiple frames out of their usual sequence, such as scrubbing or trimming video on a timeline, the server encodes each frame separately using a lower quality I-Frame codec, which is an intraframe encoding technique that allows the server to deliver frames to the client very quickly, providing a highly responsive video editing environment. In still another scenario, if the network performance is poor, the server can dynamically reduce the encoding quality of both the GOP and I-Frame codecs to reduce network bandwidth. To this end, the client sends appropriate playback context information to the server when requesting a frame, so that the appropriate encoding can be used. The so-called context information indicates, for example, a context of normal forward playback, a context of a specific editing operation (e.g., scrubbing or trimming frames, or reordering the sequence of certain frames), and/or a context of poor network performance (e.g., limited available bandwidth). Note that both the server and client each monitor network performance on an ongoing basis and use the network performance as a factor for varying the encoding quality.

Further to the above example embodiment, the client can decode and display any of the encoded frames that the server sends in its response. When the client requests a frame from the server, the server responds with a unique identifier for the frame. This identifier represents the requested frame of the video, with any effects and/or transformations that may have been applied by the server. If the same frame of video, with the same effects and/or transformations, appears in another requested sequence of the video, the server responds with the same identifier. That is, any client in the system requesting a certain video frame, regardless of network location, can receive the same identifier for the frame. Caching on the server using this identifier allows the server to avoid duplicating rendering work for multiple clients. Caching on the client avoids the need for the client to receive the frame more than once from the server. When the server responds to the client with this identifier, the client can check its local cache to see if it has a frame with the same identifier before requesting that the frame data be transmitted from the server. To provide visually consistent visual quality, the client can record the frame quality and frame size (e.g., width and height) along with the frame identifier for each frame it receives. Since the server can vary the frame compression in response to network performance, the client may receive a highly compressed and relatively poor visual quality frame when network performance is poor, but a less compressed and relatively high visual quality frame when network performance is high. Recording this quality information gives the client the opportunity to decide whether or not the version of the frame that it has cached is of an appropriate quality for the current playback or editing context. If the client sees that network performance is high, but only has a poor quality frame in its cache, the client can request a higher quality frame from the server rather than using its cached version. This technique provides consistent visual quality without the distracting visual effect of alternating between high quality and poor quality frames. This scheme can be used by the client to efficiently identify and cache video frames. In this manner, the efficiency in a networked environment can be improved.

In another embodiment, the video signal can be compressed to a lower quality by the client to help maintain consistent visual quality when the frames received from the server are of varying quality levels. For example, if the client has a high-quality cached frame, but network performance is poor, the cached frame can be decoded and compressed at a lower quality, and then decoded again, to simulate the effect of a lower-quality cached frame. This reduction in visual quality can help to avoid the distracting effect of alternating between high quality and poor quality frames.

System Architecture

FIG. 1 illustrates an example client-server system for reducing the amount of network bandwidth used by a distributed video editing system. The system includes a user computing system and a server communicatively coupled to the user computing system via a network. The user computing system includes a processor that can be used to execute a video editing application, and a local cache or data storage. The video editing application interacts with one or more input devices, such as a keyboard, mouse, light pen and/or touch screen, and one or more display devices. The local cache may include, for example, a block of memory readily accessible by the processor. The local cache may be, for example, memory that is on-board with, or sufficiently proximal to, the processor so as to allow for efficient access to content stored in the cache. The video editing application may include, for example, a version of Adobe Anywhere for Video® or other suitable video editing program. In some cases, the application and/or image repository can reside locally on the user computing system or on another network-connected device. In some other cases, the application forms part of software as a service (SaaS), in which the application can be executed remotely by a server. As used herein, the term "software as a service," in addition to its plain and ordinary meaning, includes a service delivery model in which a client-accessible application and associated data are centrally hosted on a network-based server. The server includes a processor and a server cache. The processor can be configured to execute various modules, including a video encoder, an identity assignment module and/or a video rendering module. The server cache may include, for example, a block of memory readily accessible by the processor. The local cache and server cache may be, for example, memory that is on-board with, or sufficiently proximal to, the respective processor so as to allow for efficient access to content stored in the cache. The video encoder, identity assignment module and/or video rendering module application(s) may include, for example, a version of Adobe Anywhere for Video® or other suitable video encoding program. In some cases, one or more of these components can form part of SaaS. The rendering module is configured to render a frame of video that is received from a video source. The rendered frame can be stored in the server cache. The identity assignment module is configured to assign a unique identifier to the frame, and the encoder is configured to encode the frame prior to sending the frame to the client. The video editing application, the encoder, the identity assignment module and the rendering module operate in conjunction with one another to reduce the amount of network bandwidth used by a distributed video editing system as variously described herein. Further details of the components of the client-server system of FIG. 1 are provided with reference to FIGS. 3A, 3B, 4 and 5, each of which are discussed in turn. The system may include additional components and still fall within the scope of the disclosed embodiments. The user computing system can be configured to execute any of a number of operating systems, such as Microsoft Windows®, Mac OS®, Apple iOS®, Google Android® and any one of the Linux®-based operating systems. The user computing system can be implemented with any suitable computing device, such as a laptop, desktop, tablet computer, smartphone, or other suitable computing device capable of receiving input from a user and providing a GUI via the display. The local cache and/or server cache can be implemented, for example, with any suitable type of memory, such as a disk drive included in, or otherwise in communication with, the video editing application, the encoder and identity assignment module and/or the rendering module. Other suitable memories include flash memory, random access memory (RAM), a memory stick or thumb drive, USB drive, cloud storage service, etc. In a more general sense, any memory facility can be used to implement the repository. The network can be any communications network, such as a local area network or the Internet, or any other public and/or private communication network.

It will be appreciated that, in some embodiments, various functions performed by the user computing system and server, as described herein, can performed by similar processors and/or storage devices in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. Various components of the system shown in FIG. 1, such as the video editing application, encoder, identity assignment module and rendering module, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Video Frame Use Case

A video is a group of still pictures, or frames, that can be sequentially displayed to produce moving visual images. In the digital domain, each frame is represented by image data that can be compressed for storage in a file or for transmission as a bitstream from a source to a destination (e.g., via a communications network). Such compression can be achieved using one or more encoding techniques, such as any of the Moving Picture Experts Group (MPEG) specifications (e.g., MPEG-2 and MPEG-4), to reduce the amount of image data needed to reconstruct the video. Compression is useful because it reduces resources usage, such as data storage space and transmission capacity. One video encoding scheme, referred to herein as interframe encoding, reduces the amount of image data encoded with the current frame by referencing image data encoded with earlier or later frames in a sequence. In this manner, certain frames can only be completely reproduced using image data from other frames, for example, by comparing each frame in the video with the previous frame in the sequence. For example, if one frame contains areas where no pixels have changed with respect to the previous frame, those pixels are not encoded.

Instead, a short command can be encoded into the image data that causes a video decoder to repeat those pixels in at least two successive frames. If portions of the video change from one frame to the next in a simple manner, a slightly longer command can be encoded that instructs the video decoder to shift, rotate, lighten, or darken the relevant pixels. Interframe compression works well for programs that will be played back by the viewer, but can cause problems if the video sequence needs to be edited. For example, if image data for one intermediate frame is lost or corrupt, the following frame may not be reconstructed properly. By contrast, in another video encoding scheme, referred to herein as intraframe encoding, the current frame is compressed independently of frames. In this manner, the current frame can be completely reconstructed without using image data for other frames.

Figure 2:
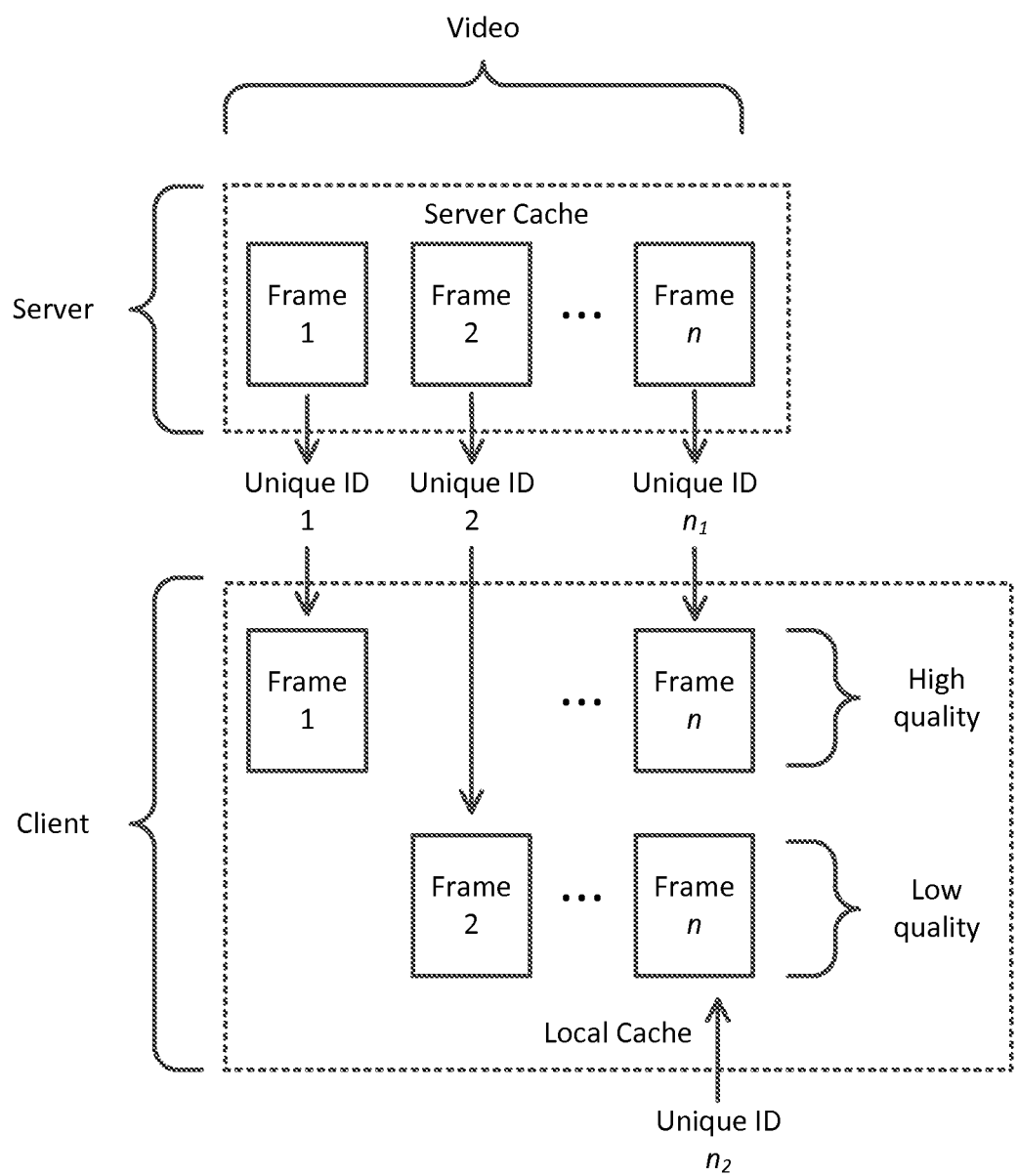
FIG. 2 is a graphical representation of an example video structure in accordance with an embodiment of the present invention.

FIG. 2 is a graphical representation of an example video structure in accordance with an embodiment. The video includes a sequence of n frames (e.g., Frame 1, Frame 2, . . . , Frame n), which may be stored in a server cache of a server, such as the server cache described with respect to FIG. 1. When the server transmits a frame of the video to a client, the frame can be encoded using one or more video encoding schemes, such as intraframe encoding and interframe encoding. Further, different frames can be compressed by varying amounts. Although there can be exceptions in specific cases, in general a highly compressed frame has a lower visual quality than it does with less compression due to corresponding losses in data fidelity. In some embodiments, the encoding scheme used, and therefore the resultant visual quality of the video on the client side, can be dependent on the capacity of the network (e.g., available bandwidth) at the time each frame or group of frames in the video are to be transmitted. For example, if the network capacity is poor, it may be desirable to use a lower fidelity encoding scheme that uses the available bandwidth more efficiently, while by contrast if the network capacity is good, it may be desirable to use a less efficient encoding scheme having higher fidelity. In some embodiments, the encoding scheme can be dependent on a context in which the client is operating instead of, or in addition to, the network capacity. For example, the client may be operating in a playback context or an editing context. In the playback context, for instance, the client may be configured to play back all or portions of the video in sequence using low quality frames. In the editing context, for instance, the client may be configured to display individual high quality still frames and/or multiple high quality frames out of sequence (e.g., in reverse order, skipping over frames in the sequence, etc.). Therefore, if the network capacity and/or context varies, it is possible for a given frame in the video to be encoded differently (e.g., using a different encoding scheme and/or compression level) than another frame in the same video. Furthermore, in cases where the same frame is transmitted over the network more than once, it is possible for that frame to be encoded using different encoding schemes and/or compression levels on subsequent transmissions.

Depending on the encoding scheme used, each frame can be transmitted from the server to a client either individually or within a group of frames. Each frame is assigned a unique identifier. The identifier represents the frame of the video, with any effects and/or transformations that may have been applied (e.g., effects and/or transformations resulting from the encoding scheme used), as it appears when displayed. Referring to FIG. 2, the server assigns Unique ID 1 to Frame 1, which is transmitted to the client and stored in a local cache, such as the local cache of FIG. 1. The client also receives Unique ID 1. In this example, Unique ID 1 represents Frame 1 encoded at high quality. The server assigns Unique ID 2 to Frame 2, which is encoded at a low quality. Therefore, Unique ID 1 is associated with Frame 1 at a high quality, and Unique ID 2 is associated with Frame 2 at a low quality. Unique identifiers can be assigned to any number of frames in the video (e.g., some or all frames), and more than one unique identifier can be assigned to the same frame. For example, in FIG. 2, Frame n encoded at high quality is assigned Unique ID $n_1$, and Frame n encoded at low quality is assigned Unique ID $n_2$. Both versions of Frame n can be stored in the local cache along with their corresponding unique identifiers.

Example Methodologies for Providing a Video Frame

Figure 3A:
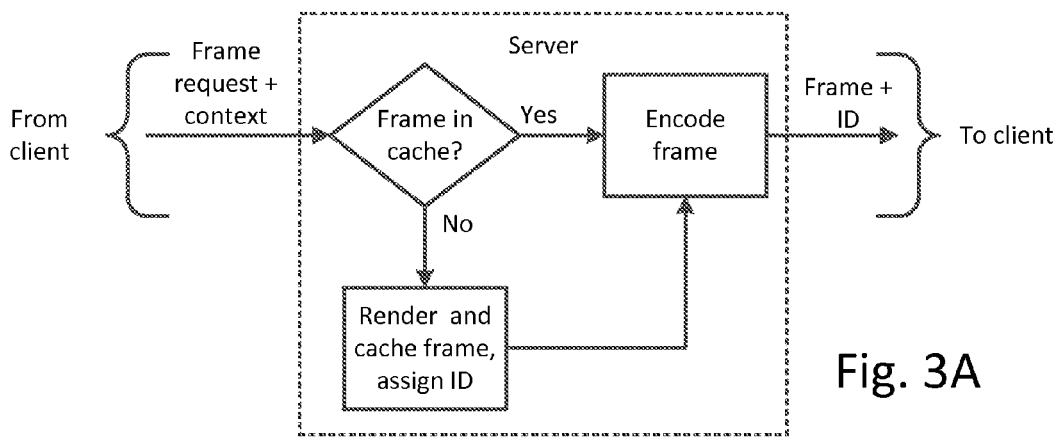
FIG. 3A illustrates an example server-side methodology for providing a video frame in accordance with an embodiment of the present invention.

FIG. 3A illustrates an example server-side methodology for providing a video frame in accordance with an embodiment. The method begins by receiving a frame request from a client, such as the client user computing system of FIG. 1. Included in the request is an operating context of the client (e.g., playback or editing context). The server uses the request to determine which frame to send to the client and, in some cases, which encoding scheme to use based on the context and/or the capacity, or performance, of the network. One specific methodology for encoding the frame is described below with respect to FIG. 3B. The server can maintain a server cache, such as described with respect to FIG. 1, in which certain frames which have already been rendered and assigned a unique identifier are stored. If the requested frame is stored in the server cache, the server proceeds to encode the cached frame and send it to the client. Otherwise, the server renders the frame, stores it in the cache and assigns a unique identifier to the frame prior to sending it to the client. The server also sends the corresponding unique identifier to the client.

Figure 3B:
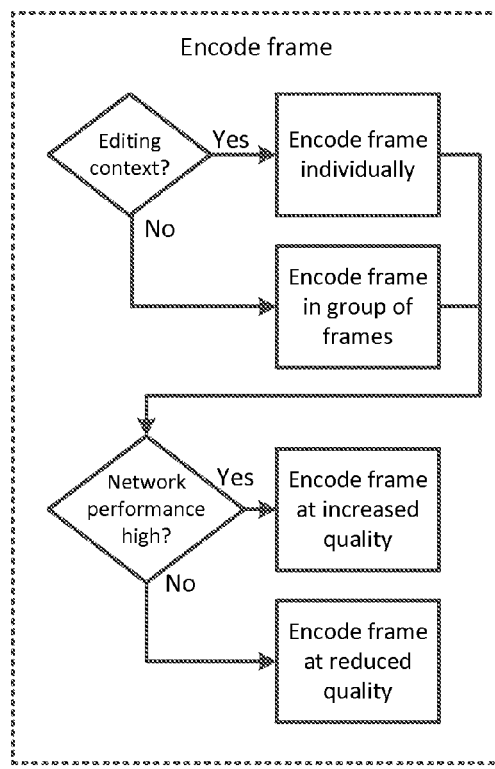
FIG. 3B illustrates an example frame encoding methodology in accordance with an embodiment of the present invention.

FIG. 3B illustrates an example server-side frame encoding methodology in accordance with an embodiment. If the context is an editing context (e.g., as opposed to a playback context), the frame is encoded individually using, for example, an intraframe encoding technique. Otherwise, the frame is encoded in a group of frames using, for example, an interframe encoding technique. In some specific cases, the encoding scheme is based at least in part on the network performance. The network performance can be determined, for example, by measuring the network connection bandwidth using a conventional or custom testing technique and/or by measuring the actual bitrate for recently transmitted or received messages. As noted above, in some circumstances the network performance can vary over time. If the network performance is high (e.g., the network has a high bandwidth), the frame is encoded an increased quality (e.g., using relatively low compression); otherwise, the frame is encoded at a reduced quality (e.g., using relatively high compression). Other encoding schemes can be used and will be apparent in light of this disclosure.

Figure 4:
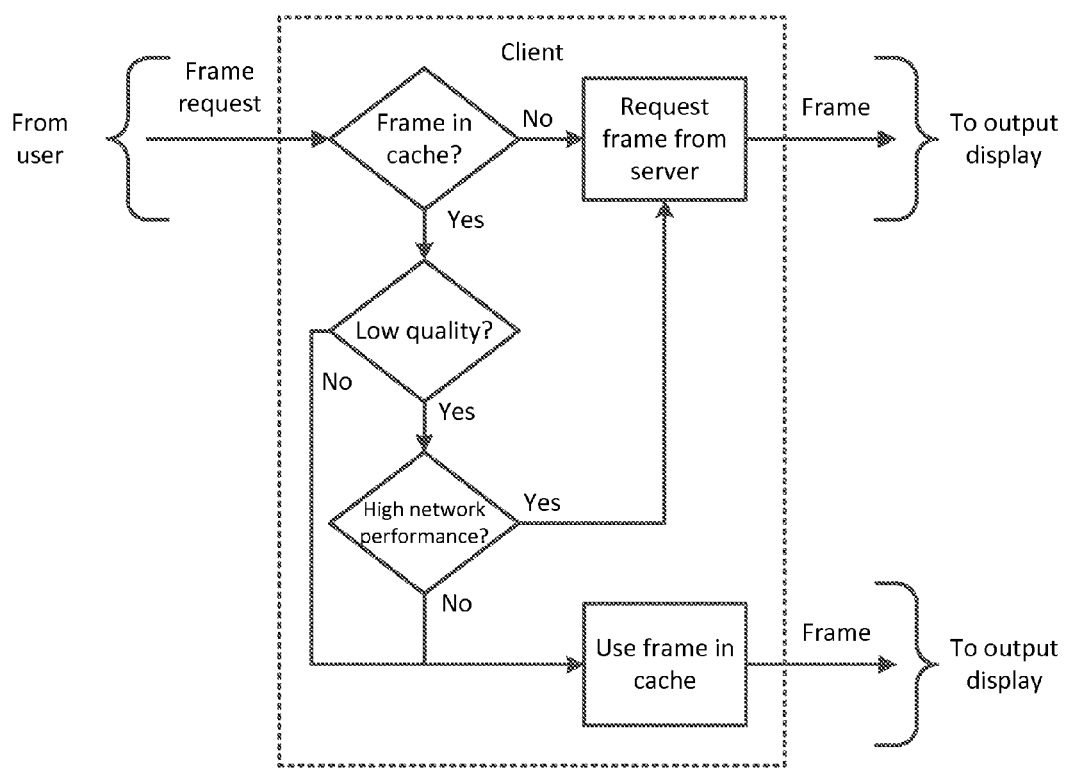
FIG. 4 illustrates an example client-side methodology for providing a video frame in accordance with an embodiment.

FIG. 4 illustrates an example client-side methodology for providing a video frame in accordance with an embodiment. In one specific embodiment, the method can be implemented by the video editing application of the client of FIG. 1. The method begins by receiving a user request for a frame. The method continues by checking a local cache, such as the local cache of FIG. 1, to determine whether the requested frame is already stored in the cache based on the unique identifier provided by the server. If the frame is not stored in the cache, the frame is requested and received from the server. Subsequently, the frame is decoded and sent to an output display device, such as the display device of FIG. 1. If the frame is stored in the cache, the quality of the frame is determined. The quality may, for example, be high or low, depending on how the frame was encoded and compressed by the server. Since it is often desirable to display high quality frames, if the quality of the frame in the cache is low or dissimilar to the quality of another frame, and if the network performance is good, the client will request a higher quality version of the frame from the server to replace or supplement the low quality version in the local cache. The high quality version can then be stored in the local cache. As mentioned above, some frames may be stored in the local cache more than once, for instance, a high quality version of the frame and a low quality version. However, if the quality of the frame in the cache is high or if the network performance is not good, the client will use the frame stored in the cache. In some embodiments, the network performance is considered good or high if the data transfer rate of the network is relatively higher than a normative data transfer rate (e.g., an average or benchmark rate), and the network performance is considered not good or low if the data transfer rate is relatively lower than the normative data transfer rate. Other techniques for determining the network performance, such as throughput testing, can be used.

Figure 5:
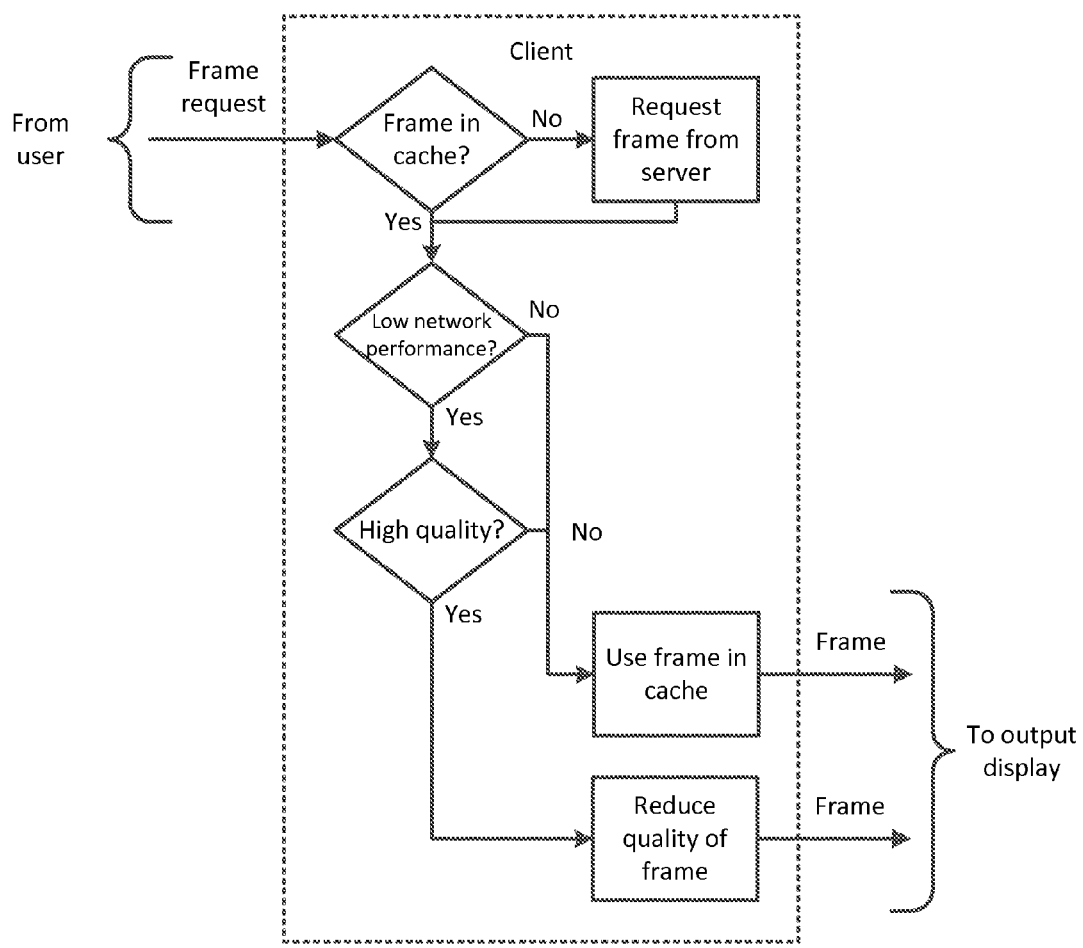
FIG. 5 illustrates another example client-side methodology for providing a video frame in accordance with an embodiment.

FIG. 5 illustrates another example client-side methodology for providing a video frame in accordance with an embodiment. In one specific embodiment, the method can be implemented by the video editing application of the client of FIG. 1. As discussed above, when the quality of the video received from the server varies between frames (e.g., some frames are high quality and some are low quality), the video signal can be compressed by the client to a lower quality, which gives all of the frames the same visual quality for consistency. This reduction in visual quality can help to avoid the distracting effect of alternating between dissimilar high quality and poor quality frames. For example, if the quality of the frame in the cache is high and if the network performance is low, the client can reduce the quality of the frame stored in the cache rather than retrieving the frame from the server. Alternately, if the quality of the frame received from the server is high (e.g., due to temporarily high network performance), the client can reduce the quality of the frame to be consistent with the lower quality of other frames in the video (e.g., frames that were received while the network performance was low). The method begins by receiving a user request for a frame. The method continues by checking a local cache, such as the local cache of FIG. 1, to determine whether the requested frame is already stored in the cache based on the unique identifier provided by the server. If the frame is not stored in the cache, the frame is requested and received from the server and stored in the local cache. Subsequently, the frame is decoded and sent to an output display device, such as the display device of FIG. 1. If the frame is stored in the cache, the performance or capacity of the network is determined. If the network performance is low and the quality of the frame stored in the cache is high, the quality of the frame stored in the cache is reduced. This is because it would be less time consuming to reduce the quality of the frame is the cache than to retrieve the frame from the server with a low network performance. If the network performance is not low, the frame stored in the cache is used without quality reduction.

Numerous embodiments will be apparent in light of the present disclosure, and features described herein can be combined in any number of configurations. One example embodiment provides a computer-implemented method. The method includes sending a request for a video frame to a server, the request including a context; receiving, via a network, image data representing the video frame and a unique identifier associated with the image data, the image data being encoded by the server using one of a plurality of predefined video encoding schemes corresponding to the context; and storing the image data and the unique identifier in a local cache. In some cases, the method includes decoding the image data; and displaying the video frame on a display device based on the decoded image data. In some cases, the predefined video encoding scheme includes: interframe compression, in response to the context including video playback; intraframe compression, in response to the context including video editing; high quality data compression, in response to the context including a network performance characteristic that includes a high data transfer rate relative to a normative data transfer rate; and/or low quality data compression, in response to the context including a network performance characteristic that includes a low data transfer rate relative to a normative data transfer rate. In some cases, the method includes determining a video quality of the video frame. In some such cases, the video quality includes at least one of video frame resolution and video frame compression ratio. In some such cases, the method includes determining whether the video quality of the video frame stored in the local cache is dissimilar to a video quality of another video frame stored in the local cache. In some such specific cases, the method includes, in response to a determination that the video frame stored in the local cache is dissimilar, determining a performance characteristic of the network; determining whether the video quality of the video frame stored in the local cache can be improved based on the performance characteristic of the network; and sending another request for the video frame to the server in response to a determination that the video quality can be improved. In some such specific cases, the method includes receiving, via the network, additional image data representing the same video frame at an improved video quality with respect to the image data stored in the local cache, and receiving a different unique identifier associated with the additional image data. In some cases, the method includes reducing video quality of the video frame in response to a determination that the video frame stored in the local cache is dissimilar to the video quality of another video frame stored in the cache. In some cases, some or all of the functions variously described in this paragraph can be performed in any order and at any time by one or more different user computing systems.

Another example embodiment provides a computer-implemented method. The method includes receiving a request for a video frame from a client, the request including a context; retrieving image data representing the video frame from a server cache; encoding the image data using one of a plurality of predefined video encoding schemes corresponding to the context; assigning a unique identifier to the image data; and sending, via a network, the image data and the unique identifier to the client. In some cases, the method includes rendering the video frame to produce the image data; and storing the image data in the server cache. In some cases, the predefined video encoding scheme includes: interframe compression, in response to the context including video playback; intraframe compression, in response to the context including video editing; high quality data compression, in response to the context including a network performance characteristic that includes a high data transfer rate relative to a normative data transfer rate; and/or low quality data compression, in response to the context including a network performance characteristic that includes a low data transfer rate relative to a normative data transfer rate. In some cases, the method includes determining a performance characteristic of the network; and selecting the predefined video encoding scheme based at least in part on the performance characteristic. In some such cases, the predefined video encoding scheme includes: high quality data compression, in response to a determination that the performance characteristic includes a high data transfer rate relative to a normative data transfer rate; and low quality data compression, in response to a determination that the performance characteristic includes a low data transfer rate relative to a normative data transfer rate.

Another example embodiment provides a system having a storage and a processor operatively coupled to the storage. The processor is configured to execute instructions stored in the storage that when executed cause the processor to carry out a process including sending a request for a video frame to a server, the request including a context; receiving, via a network, image data representing the video frame and a unique identifier associated with the image data, the image data being encoded by the server using one of a plurality of predefined video encoding schemes corresponding to the context; and storing the image data and the unique identifier in a local cache. In some cases, the predefined video encoding scheme includes: interframe compression, in response to the context including video playback; and intraframe compression, in response to the context including video editing. In some cases, the process includes determining a video quality of the video frame; determining whether the video quality of the video frame stored in the local cache is dissimilar to a video quality of another video frame stored in the local cache; in response to a determination that the video frame stored in the local cache is dissimilar, determining a performance characteristic of the network; determining whether the video quality of the video frame stored in the local cache can be improved based on the performance characteristic of the network; and sending another request for the video frame to the server in response to a determination that the video quality can be improved. Another example embodiment provides a non-transient computer-readable medium or computer program product having instructions encoded thereon that when executed by one or more processors cause the processor(s) to perform one or more of the functions variously described in this paragraph.

Another example embodiment provides a system having a storage and a processor operatively coupled to the storage. The processor is configured to execute instructions stored in the storage that when executed cause the processor to carry out a process including receiving a request for a video frame from a client, the request including a context; retrieving image data representing the video frame from a server cache; encoding the image data using one of a plurality of predefined video encoding schemes corresponding to the context; assigning a unique identifier to the image data; and sending, via a network, the image data and the unique identifier to the client. In some cases, the predefined video encoding scheme includes: interframe compression, in response to the context including video playback; and intraframe compression, in response to the context including video editing. In some cases, the process includes determining a performance characteristic of the network; and selecting the predefined video encoding scheme based at least in part on the performance characteristic, wherein the predefined video encoding scheme includes: high quality data compression, in response to a determination that the performance characteristic includes a high data transfer rate relative to a normative data transfer rate; and low quality data compression, in response to a determination that the performance characteristic includes a low data transfer rate relative to a normative data transfer rate. Another example embodiment provides a non-transient computer-readable medium or computer program product having instructions encoded thereon that when executed by one or more processors cause the processor(s) to perform one or more of the functions variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
    displaying a first video frame on a display device at a first video quality;
    sending a request for a second video frame to a server, the request including a context;
    receiving, via a network, image data representing the second video frame and a unique identifier associated with the second video frame, the image data being encoded by the server using one of a plurality of predefined video encoding schemes corresponding to the context;
    storing the image data and the unique identifier in a local cache;
    determining a second video quality of the second video frame stored in the local cache;
    determining whether the second video quality of the second video frame stored in the local cache is dissimilar to the first video quality of the first video frame displayed on the display device;
    reducing the second video quality of the second video frame to the first video quality in response to a determination that the second video quality is dissimilar to the first video quality; and
    displaying the second video frame on the display device at the first video quality sequentially after displaying the first video frame at the first video quality.

2. The method of claim 1, further comprising:
    decoding the image data;
    wherein the displaying of the second video frame on the display device is based on the decoded image data.

3. The method of claim 1, wherein the predefined video encoding scheme includes:
    interframe compression, in response to the context including video playback; and
    intraframe compression, in response to the context including video editing.

4. The method of claim 1, wherein the predefined video encoding scheme includes:
    high quality data compression, in response to the context including a network performance characteristic that includes a high data transfer rate relative to a normative data transfer rate; and
    low quality data compression, in response to the context including a network performance characteristic that includes a low data transfer rate relative to a normative data transfer rate.

5. The method of claim 1, wherein the second video quality includes at least one of video frame resolution and video frame compression ratio.

6. The method of claim 1, further comprising determining whether the second video quality of the second video frame stored in the local cache is dissimilar to a video quality of another video frame stored in the local cache.

7. The method of claim 6, further comprising:
in response to a determination that the second video quality of the second video frame stored in the local cache is dissimilar to the video quality of the other video frame stored in the local cache, determining a performance characteristic of the network;
determining whether the second video quality of the second video frame stored in the local cache can be improved based on the performance characteristic of the network; and
sending another request for the second video frame to the server in response to a determination that the second video quality can be improved.

8. The method of claim 7, further comprising receiving, via the network, additional image data representing the second video frame at an improved video quality with respect to the image data stored in the local cache, and receiving a different unique identifier associated with the additional image data.

9. The method of claim 1, further comprising:
determining whether the second video quality of the second video frame stored in the local cache can be improved based on a performance characteristic of the network; and
sending another request for the second video frame to the server in response to a determination that the second video quality can be improved.

10. The method of claim 1, further comprising:
in response to a determination that the second video quality of the second video frame stored in the local cache is dissimilar to the video quality of the first video frame displayed on the display device, sending another request for the second video frame to the server;
receiving, via the network, new image data representing the second video frame at a video quality that is the same as the first video quality of the displayed video frame;
decoding the new image data; and
displaying the second video frame on the display device based on the decoded new image data sequentially after displaying the first video frame.

11. A system comprising:
a storage; and
a processor operatively coupled to the storage and configured to execute instructions stored in the storage that when executed cause the processor to carry out a process comprising:
displaying a first video frame on a display device at a first video quality;
sending a request for a second video frame to a server, the request including a context;
receiving, via a network, image data representing the second video frame and a unique identifier associated with the second video frame, the image data being encoded by the server using one of a plurality of predefined video encoding schemes corresponding to the context;
storing the image data and the unique identifier in a local cache;
determining a second video quality of the second video frame stored in the local cache;
determining whether the second video quality of the second video frame stored in the local cache is dissimilar to the first video quality of the first video frame displayed on the display device;
reducing the second video quality of the second video frame to the first video quality in response to a determination that the second video quality is dissimilar to the first video quality; and
displaying the second video frame on the display device at the first video quality sequentially after displaying the first video frame at the first video quality.

12. The system of claim 11, wherein the second video quality includes at least one of video frame resolution and video frame compression ratio.

13. The system of claim 11, wherein the process further comprises:
determining whether the second video quality of the second video frame stored in the local cache can be improved based on the performance characteristic of the network; and
sending another request for the second video frame to the server in response to a determination that the second video quality can be improved.

14. The system of claim 13, wherein the process further comprises receiving, via the network, additional image data representing the second video frame at an improved video quality with respect to the image data stored in the local cache, and receiving a different unique identifier associated with the additional image data.

15. The system of claim 11, wherein the process further comprises:
decoding the image data;
wherein the displaying of the second video frame on the display device is based on the decoded image data.

16. The system of claim 11, wherein the predefined video encoding scheme includes:
high quality data compression, in response to the context including a network performance characteristic that includes a high data transfer rate relative to a normative data transfer rate; and
low quality data compression, in response to the context including a network performance characteristic that includes a low data transfer rate relative to a normative data transfer rate.

17. The system of claim 11, wherein the process further comprises determining whether the second video quality of the second video frame stored in the local cache is dissimilar to a video quality of another video frame stored in the local cache.

18. A non-transitory computer program product having instructions encoded thereon that when executed by one or more processors cause the one or more processors to perform a process comprising:
displaying a first video frame on a display device at a first video quality;
sending a request for a second video frame to a server, the request including a context;
receiving, via a network, image data representing the second video frame and a unique identifier associated with the second video frame, the image data being encoded by the server using one of a plurality of predefined video encoding schemes corresponding to the context;
storing the image data and the unique identifier in a local cache;
determining a second video quality of the second video frame stored in the local cache;

determining whether the second video quality of the second video frame stored in the local cache is dissimilar to the first video quality of the first video frame displayed on the display device;

reducing the second video quality of the second video frame to the first video quality in response to a determination that the second video quality is dissimilar to the first video quality; and displaying the second video frame on the display device at the first video quality sequentially after displaying the first video frame at the first video quality.

* * * * *